(12) United States Patent
Lee et al.

(10) Patent No.: US 10,278,066 B2
(45) Date of Patent: Apr. 30, 2019

(54) METHOD AND APPARATUS FOR DISPLAYING IDENTIFICATION OF LOST DEVICE FOR ANTI-THEFT OPERATIONS

(71) Applicant: LG ELECTRONICS INC., Seoul (KR)

(72) Inventors: Ki-Dong Lee, San Diego, CA (US); Sang Gook Kim, California, CA (US); Jun Kyung Park, Seoul (KR); Daniel Jaeyong Park, San Diego, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/567,867

(22) PCT Filed: May 4, 2016

(86) PCT No.: PCT/KR2016/004749
§ 371 (c)(1),
(2) Date: Oct. 19, 2017

(87) PCT Pub. No.: WO2016/178531
PCT Pub. Date: Nov. 10, 2016

(65) Prior Publication Data
US 2018/0115890 A1  Apr. 26, 2018

Related U.S. Application Data

(60) Provisional application No. 62/156,818, filed on May 4, 2015.

(51) Int. Cl.
*H04W 8/00* (2009.01)
*H04W 8/26* (2009.01)
(Continued)

(52) U.S. Cl.
CPC .............. *H04W 8/26* (2013.01); *G08B 21/24* (2013.01); *H04M 1/673* (2013.01)

(58) Field of Classification Search
CPC ......... H04W 8/26; G08B 21/24; H04M 1/673
See application file for complete search history.

(56) References Cited

U.S. PATENT DOCUMENTS

| | | | | |
|---|---|---|---|---|
| 5,600,708 A | * | 2/1997 | Meche | H04W 8/22 455/411 |
| 2014/0038564 A1 | * | 2/2014 | Mahaffey | H04L 41/0253 455/411 |
| 2014/0329500 A1 | * | 11/2014 | Wang | H04W 12/12 455/411 |

FOREIGN PATENT DOCUMENTS

JP    2012129965    7/2012
KR    1020000042657    7/2000
(Continued)

OTHER PUBLICATIONS

PCT International Application No. PCT/KR2016/004749, Notification of Transmittal of the International Search Report and the Written Opinion of the International Searching Authority, or Declaration dated Aug. 19, 2016, 10 pages.

*Primary Examiner* — Khai M Nguyen
(74) *Attorney, Agent, or Firm* — Lee, Hong, Degerman, Kang & Waimey (57) ABSTRACT

The present invention provides methods and apparatus for displaying identifications of lost device for anti-theft operation. One of methods for displaying identifications of a mobile device for anti-theft operation in a wireless access system, the method comprises steps of receiving a paging message including a show lock screen command indicating whether a screen-lock is requested and a displaying identification indication requesting a display of device identification of the mobile device on a screen of the mobile device;

(Continued)

and displaying the device identification on the locked screen according to the show lock screen command and the displaying identification indication.

12 Claims, 9 Drawing Sheets

(51) Int. Cl.
*G08B 21/24* (2006.01)
*H04M 1/673* (2006.01)

(56) References Cited

FOREIGN PATENT DOCUMENTS

| KR | 1020040100153 | 12/2004 |
|----|---------------|---------|
| KR | 1020060118641 | 11/2006 |
| KR | 1020090056279 | 6/2009  |

\* cited by examiner

(a) Control-Plane Protocol Stack (b) User-Plane Protocol Stack

METHOD AND APPARATUS FOR DISPLAYING IDENTIFICATION OF LOST DEVICE FOR ANTI-THEFT OPERATIONS

CROSS-REFERENCE TO RELATED APPLICATIONS

This application is the National Stage filing under 35 U.S.C. 371 of International Application No. PCT/KR2016/004749, filed on May 4, 2016, which claims the benefit of U.S. Provisional Application No. 62/156,818, filed on May 4, 2015, the contents of which are all hereby incorporated by reference herein in its entirety.

TECHNICAL FIELD

The present invention relates to a wireless access system, and more particularly, to methods and apparatus for displaying identifications of lost device for Anti-theft operation.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY OF THE INVENTION

Accordingly, the object of the present invention is to provide methods for displaying device identifications of lost mobile device for anti-theft operations.

Another object of the present invention is to provide mobile device and eNB served as a service provider for supporting the above-described methods.

Technical problems to be solved by the present invention are not limited to the above-mentioned technical problem, and other technical problems not mentioned above can be clearly understood by one skilled in the art from the following description.

The present invention provides methods and apparatus for displaying identifications of lost device for anti-theft operation.

In one aspect of the present invention, a method for displaying identifications of a mobile device for anti-theft operation in a wireless access system, the method comprises steps of receiving a paging message including a show lock screen command indicating whether a screen-lock is requested and a displaying identification indication requesting a display of device identification of the mobile device on a screen of the mobile device; and displaying the device identification on the locked screen according to the show lock screen command and the displaying identification indication.

In another aspect of the present invention, a mobile device for displaying identifications for anti-theft operation in a wireless access system, the mobile device comprises a receiver, a processor, and a screen. Wherein the processor is configured to receive, by controlling the receiver, a paging message including a show lock screen command indicating whether a screen-lock is requested and a displaying identification indication requesting a display of device identification of the mobile device on a screen of the mobile device; and display, by controlling the screen, the device identification on the locked screen according to the show lock screen command and the displaying identification indication.

The device identifications may include at least one an International Mobile Equipment Identifier (IMEI), an International Mobile Subscriber Identity (IMSI), a Medium Access Control IDentification (MAC ID) for Wi-Fi chipset, an MSISDN (Mobile Station International ISDN (Integrated Services Digital Network) Number, or a Mobile Identification Number (MIN), a maker of the device, or a model name (plus number).

The device identifications may be included in the paging message.

The device identifications may be pre-stored in the mobile device or may be composed by a service provider including a wireless carrier, an OS provider, or a 3rd party service provider.

The paging message may further include displaying message including specific warning phrase.

The above embodiments are part of preferred embodiments of the present invention. Obviously, it is to be understood to those having ordinary knowledge in the art that various embodiments having the technical features of the present invention can be implemented on the detailed description of the present invention as set forth herein.

According to exemplary embodiments of the present invention, the following advantages can be obtained.

First of all, by using a paging message, the show lock screen command can be reliably transmitted.

In addition, the law enforcement or authorized entity is able to easily identify the status of the mobile device under theft investigation.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, illustrate embodiments of the invention and together with the description tion served to explain the principle of the invention. In the drawings.

DETAILED DESCRIPTION OF THE INVENTION

Exemplary embodiments of the present invention provide a method and apparatus for displaying identifications of lost device for anti-theft operation.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood by those skilled in the art will not be described either.

In the embodiments of the present invention, a description has been mainly made of a data transmission and reception relationship between an enhanced NodeB (eNB) and a user equipment (UE). The eNB refers to a terminal node of a network, which directly or indirectly communicates with a UE. A specific operation described as being performed by the eNB may be performed by an upper node of the eNB.

Namely, it is apparent that, in a network comprised of a plurality of network nodes including the eNB, various operations performed for communication with a UE may be performed by the eNB, or network nodes other than the eNB. The term 'eNB' may be replaced with a fixed station, an ABS (Advanced Base Station), or PLMN etc. Especially, it should be noted that the terms 'eNB' and 'eNode-B' are used interchangeably and the terms 'UE' and 'terminal' are interchangeably used in the embodiments of the present invention.

A transmitter is a fixed and/or mobile node that provides a data or voice service and a receiver is a fixed and/or mobile node that receives a data or voice service. Therefore, an UE may serve as a transmitter and an eNB (or NB) may serve as a receiver, on uplink. Likewise, the UE may serve as a receiver and the eNB (or NB) may serve as a transmitter, on downlink.

The embodiments of the present invention are supported by standard documents disclosed for at least one of wireless access systems including a 3GPP system, a 3GPP LTE system, and a 3GPP2 system. In particular, the embodiments of the present invention are supported by 3GPP TS 36.211, 3GPP TS 36.212, 3GPP TS 36.213, 3GPP TS 36.321, 3GPP TS 36.331 and ATIS-0700024 standard documents. The steps or parts, which are not described to clearly reveal the technical idea of the present invention, in the embodiments of the present invention may be supported by the above documents. All terms used in the embodiments of the present invention may be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. Specific terms used for the embodiments of the present invention are provided to aid in understanding of the present invention. These specific terms may be replaced with other terms within the scope and spirit of the present invention.

The embodiments of the present invention may be used in various wireless access technologies, such as CDMA (Code Division Multiple Access), FDMA (Frequency Division Multiple Access), TDMA (Time Division Multiple Access), OFDMA (Orthogonal Frequency Division Multiple access), and SC-FDMA (Single Carrier Frequency Division Multiple Access).

CDMA may be implemented with radio technology such as UTRA (Universal Terrestrial Radio Access) or CDMA2000. TDMA may be implemented with radio technology such as GSM (Global System for Mobile communications)/GPRS (General Packet Radio Service)/EDGE (Enhanced Data Rates for GSM Evolution). OFDMA may be implemented with radio technology such as IEEE 802.11 (Wi-Fi), IEEE 802.16 (WiMAX), IEEE 802.20, and E-UTRA (Evolved UTRA).

UTRA is part of a UMTS (Universal Mobile Telecommunications System). 3GPP LTE is a part of Evolved UMTS (E-UMTS), which uses E-UTRA. 3GPP LTE employs OFDMA on downlink and uses SC-FDMA on uplink. LTE-A (Advanced) is an evolved version of 3GPP LTE. The following embodiments of the present invention mainly describe examples of the technical characteristics of the present invention as applied to the 3GPP LTE/LTE-A systems.

1. An Overall of 3GPP LTE/LTE-A Systems

In a wireless access system, a UE receives information from a BS through a downlink and transmits information to the BS through an uplink. Information transmitted and received between the UE and the BS includes general data information and control information. A variety of physical channels are provided according to type/use of information transmitted and received between the UE and the BS.

1.1 System Architecture

Figure 1:
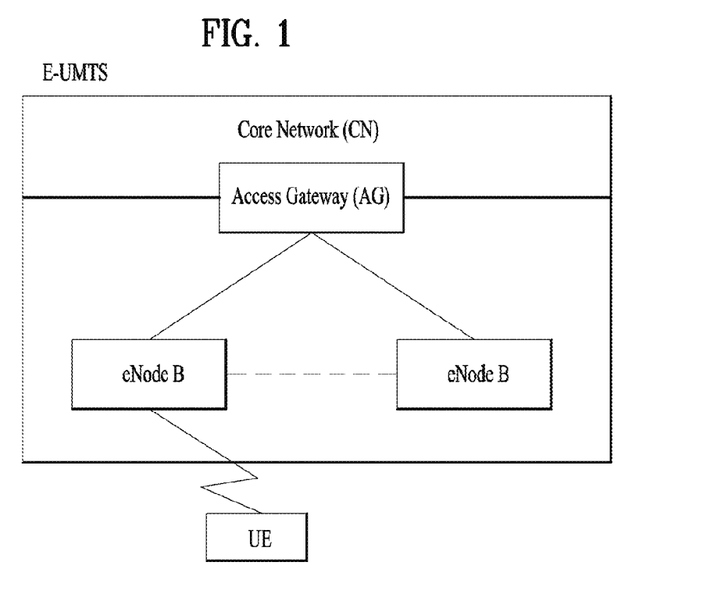
FIG. 1 illustrates a schematic structure a network structure of an evolved universal mobile telecommunication system (E-UMTS)

FIG. 1 illustrates a schematic structure a network structure of an evolved universal mobile telecommunication system (E-UMTS). An E-UMTS system is an evolved version of the WCDMA UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network". In these days, an evolved system of the 3GPP LTE has been appeared and it is referred as 3GPP LTE-A (3GPP LTE advanced) system. Details of the technical specifications of the 3GPP LTE-A system are referred to Releases 9 to 12.

Referring to FIG. 1, the E-UMTS mainly includes a User Equipment (UE), base stations (or eNBs or eNode Bs), and an Access Gateway (AG) which is located at an end of a network (e.g., E-UTRAN) and which is connected to an external network. Generally, an eNB can simultaneously transmit multiple data streams for a broadcast service, a multicast service and/or a unicast service.

The AG can be divided into a part that handles processing of user traffic and a part that handles control traffic. Here, the AG part for processing new user traffic and the AG part for processing control traffic can communicate with each other using a new interface. One or more cells may be present for one eNB. An interface for transmitting user traffic or control traffic can be used between eNBs.

A Core Network (CN) may include the AG and a network node or the like for user registration of UEs. An interface for discriminating between the E-UTRAN and the CN can be used. The AG manages mobility of a UE on a Tracking Area (TA) basis. One TA includes a plurality of cells. When the UE has moved from a specific TA to another TA, the UE notifies the AG that the TA where the UE is located has been changed.

Figure 2:
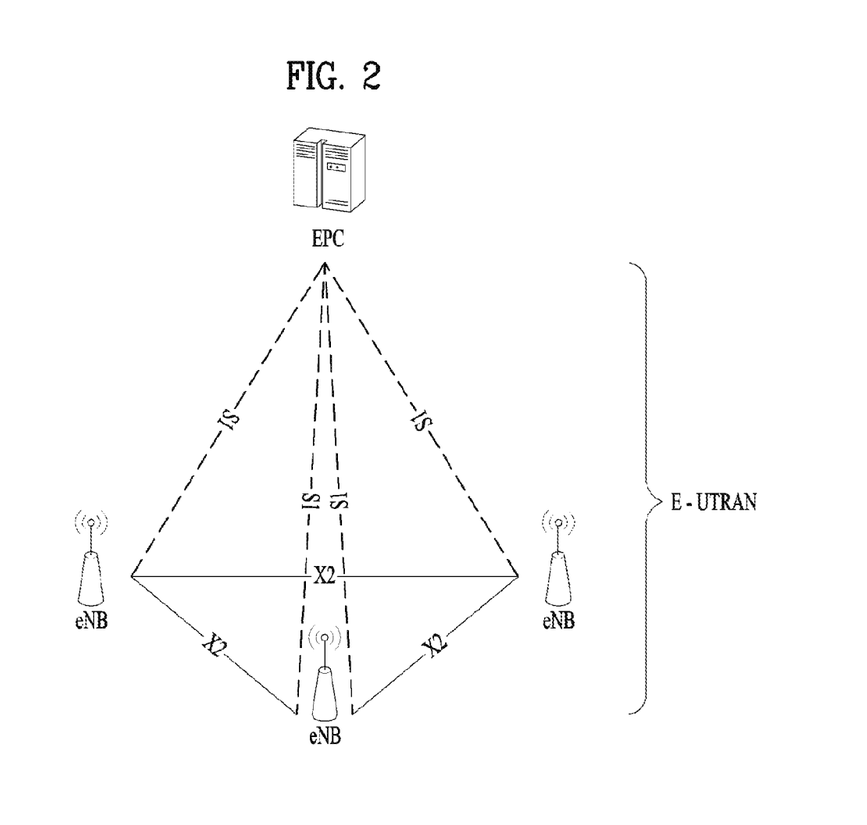
FIG. 2 illustrates a schematic structure of an Evolved Universal Terrestrial Radio Access Network (E-UTRAN)

FIG. 2 illustrates a network structure of an Evolved Universal Terrestrial Radio Access Network (E-UTRAN) system. The E-UTRAN system is an evolved version of the conventional UTRAN system. The E-UTRAN includes base stations that will also be referred to as "eNode Bs" or "eNBs".

The eNBs are connected through X2 interfaces. The X2 user plane interface (X2-U) is defined between eNBs. The X2-U interface provides nonguaranteed delivery of user plane PDUs. The X2 control plane interface (X2-CP) is defined between two neighbor eNBs. The X2-CP performs following functions: context transfer between eNBs, control of user plane tunnels between source eNB and target eNB, transfer of handover related messages, uplink load management and the like.

Each eNB is connected to User Equipment (UE) through a radio interface and is connected to an Evolved Packet Core (EPC) through an S1 interface. The S1 user plane interface (S1-U) is defined between the eNB and the S-GW. The S1-U interface provides nonguaranteed delivery of user plane PDUs between the eNB and the S-GW (Serving Gateway). The S1 control plane interface (e.g., S1-MME) is defined between the eNB and the MME (Mobility Management Entity). The S1 interface performs following functions: EPS (Evolved Packet System) Bearer Service Management function, NAS (Non-Access Stratum) Signaling Transport function, Network Sharing Function, MME Load balancing Function and the like.

Figure 3:
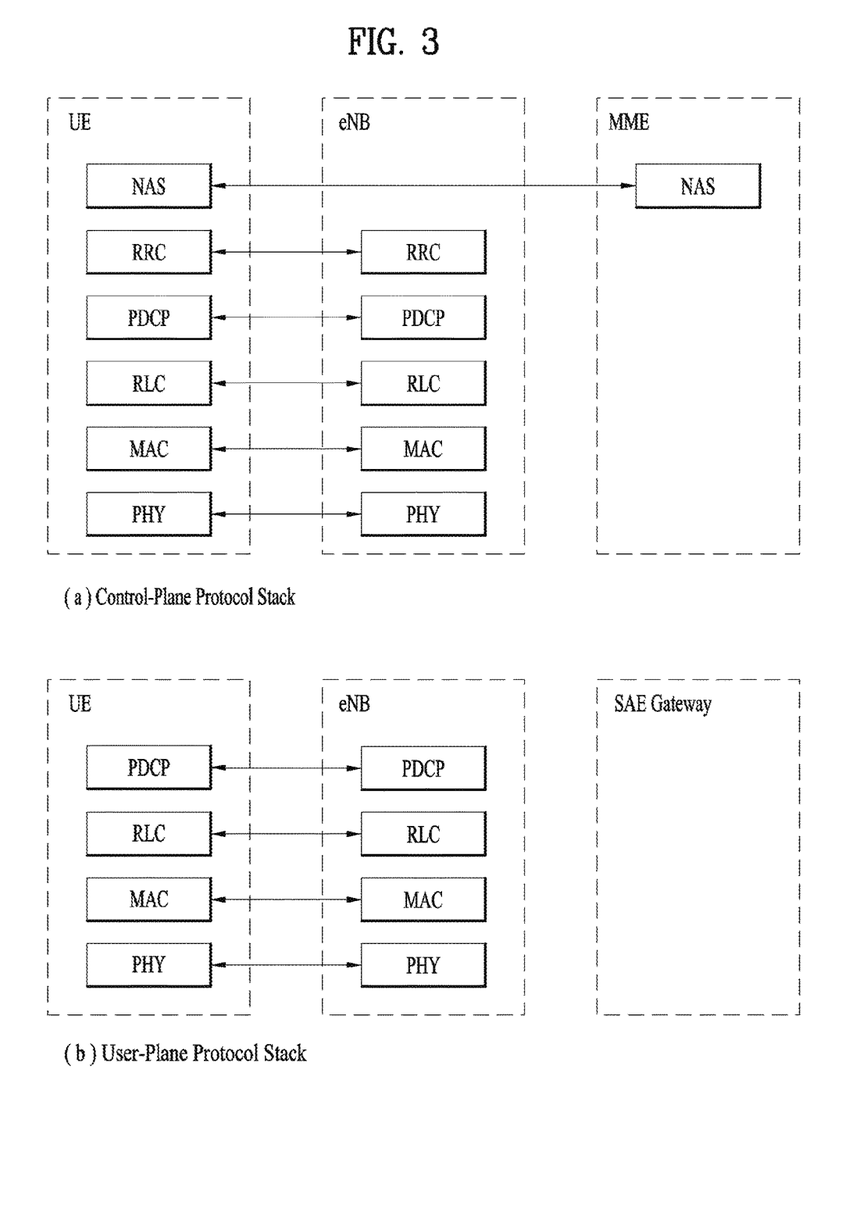
FIG. 3 illustrates the configurations of a radio interface protocol between the E-UTRAN and a UE.

FIG. 3 illustrates the configurations of a control plane and a user plane of a radio interface protocol between the E-UTRAN and a UE based on the 3GPP radio access network standard. The radio interface protocol is divided horizontally into a physical layer, a data link layer, and a network layer, and vertically into a user plane for data transmission and a control plane for signaling. The protocol layers of FIG. 3 can be divided into an L1 layer (first layer), an L2 layer (second layer), and an L3 layer (third layer) based on the lower three layers of the Open System Interconnection (OSI) reference model widely known in communication systems.

The control plane is a passage through which control messages that a UE and a network use in order to manage calls are transmitted. The user plane is a passage through which data (e.g., voice data or Internet packet data) generated at an application layer is transmitted. The following is a detailed description of the layers of the control and user planes in a radio interface protocol.

The physical layer, which is the first layer, provides an information transfer service to an upper layer using a physical channel. The physical layer is connected to a Media Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel is modulated according to the Orthogonal Frequency Division Multiplexing (OFDM) method, using time and frequencies as radio resources.

The MAC layer of the second layer provides a service to a Radio Link Control (RLC) layer, located above the MAC layer, through a logical channel. The RLC layer of the second layer supports reliable data transmission. The functions of the RLC layer may also be implemented through internal functional blocks of the MAC layer. In this case, the RLC layer need not be present. A PDCP layer of the second layer performs a header compression function to reduce unnecessary control information in order to efficiently transmit IP packets such as IPv4 or IPv6 packets in a radio interface with a relatively narrow bandwidth.

A Radio Resource Control (RRC) layer located at the bottom of the third layer is defined only in the control plane and is responsible for control of logical, transport, and physical channels in association with configuration, re-configuration, and release of Radio Bearers (RBs). The RB is a service that the second layer provides for data communication between the UE and the E-UTRAN. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode.

A Non-Access Stratum (NAS) layer located above the RRC layer performs functions such as session management and mobility management. NAS layer situated above RRC layer performs such a function as a session management and a mobility management and the like. In the NAS layer, in order to manage mobility of a user equipment, two kinds of states EMM-REGISTERED (EPS mobility Management-REGISTERED) and EMM-DEREGISTERED are defined. These two states may apply to a user equipment and an MME. A user equipment in an early stage is in EMM-DEREGISTERED state. In order to access a network, this user equipment performs a process for registering with the corresponding network via an initial attach procedure. If the attach procedure is successfully completed, each of the user equipment and the MME enters EMM-REGISTERED states.

In order to manage a signaling connection between a user equipment and an EPC, two kinds of states ECM-IDLE (EPS connection management) and ECM-CONNECTED are defined in the NAS layer. These two states may apply to a user equipment and an MME. If a user equipment in ECM-IDLE state establishes an RRC connection with E-UTRAN, the corresponding user equipment is in ECM-CONNECTED state. If MME in ECM-ILDE establishes S1 connection with E-UTRAN, the corresponding MME enters ECM-CONNECTED state.

When a user equipment is in ECM-IDLE state, E-UTRAN may not have information (context) of the user equipment. Hence, the user equipment in ECM-IDLE state may perform a UE based mobility related procedure such as a cell selection and a cell reselection without receiving a command from a network. On the contrary, when a user equipment in ECM-CONNECTED state, mobility of the user equipment is managed by a command given by a network. If a location of a user equipment in ECM-IDLE state deviates from a location known to a network, the user equipment informs the network of a corresponding location of the user equipment through a tracking area update procedure.

One cell of the eNB is set to use a carrier bandwidth such as 1.25, 2.5, 5, 10 or 20 MHz to provide a downlink transmission or uplink reception service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages, and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

1.2 Location Registration

A Public Land Mobile Network (PLMN) is a network established and operated by an Administration or a RPOA (Recognized Private Operating Agency) for the specific purpose of providing land mobile communication services to the public. The PLMN provides communication possibilities for mobile users. For communication between mobile and fixed users, interworking with a fixed network is necessary. Therefore, PLMNs shall provide a location registration function with the main purpose of providing continuity of service to UEs over the whole system area. The location registration function shall be such as to allow:

Fixed subscribers to call a UE by only using the directory number of the UE irrespective of where the UE is located in the system area at the time of the call.

UEs to access the system irrespective of the location of the UE.

UEs to identify when a change in location area has taken place in order to initiate automatic location updating procedures.

In the embodiments of the present invention, a Home Public Land Mobile Network (HPLMN) and a Visited Public Land Mobile Network (VPLMN) can be defined. The HPMLN is a PLMN where the Mobile Country Code (MCC) and Mobile Network Code (MNC) of the PLMN identity are the same as the MCC and MNC of the International Mobile Subscriber Identity (IMSI) or the defined Equivalent HPLMN (EHPLMN). In addition, the VPLMN is a PLMN on which the mobile subscriber has roamed when leaving their Home PLMN. In addition, the HPLMN can be referred to a home network and the VPLMN can be referred to a serving network in the embodiments of the present invention.

2. Methods for Displaying Identifications of Lost Device

People rely daily on mobile devices not only for traditional voice and text communications but also as essential gateways to the Internet for browsing the data they need and as repositories for personal and business information. As a result, mobile device theft is a significant concern. Mobile device thefts can impose personal, physical, and financial harm and damage on consumers.

Mobile device theft is a complex issue that is present on both local and global levels. Recently, there are collective efforts from law enforcements and industry stakeholders, generically known as "Kill Switch" to prevent mobile device theft from spreading out as one of major crime trends.

Kill Switch is a smart device-based (including smartphones) anti-theft measure that, once initiated and successfully executed on the smart device, renders the essential features of the device inoperable by an unauthorized user. An authorized user can reverse the restriction of functionality by authenticating with credentials accepted by the anti-theft solution.

The kill switch, also known as an emergency stop or e-stop, is a safety mechanism used to shut off the mobile device in an emergency situation in which it cannot be shut down in the usual manner Unlike a normal shut-down switch/procedure, which shuts down all systems in an orderly fashion and turns the machine off without damaging it, a kill switch is designed and configured to completely and as quickly as possible abort the operation (even if this damages equipment) and be operable in a manner that is quick, simple so that even a panicking operator with impaired executive function can activate it. The kill switches are usually designed so as to be obvious even to an untrained operator or a bystander.

With regard to the kill switch, 4 domains of solution are broadly considered in implementing it, such as (1) Data base solutions, (2) Device based solutions, (3) 3rd party solutions, and (4) Operator solutions.

When Kill Switch functionalities are initiated, there should be methods and procedures for law enforcement (or equivalent) to obtain device identifiers from smartphones in their possession that are under theft investigation. Otherwise it is hard for law enforcement (or equivalent) to identify the status the device under theft investigation. That is, the kill switch is too strong solution to prevent from being theft, so it cannot be accessible for authorized one or law enforcements. Accordingly, ordinary ways of obtaining device identifiers will also be blocked by initiating Kill Switch.

In this invention, methods for displaying identifications of smart devices are provided to handle the situations previously mentioned. While this invention can be applicable to all domains of the four solutions, the present invention focuses on device-based solutions for clarity and illustration purpose.

In the present invention, the term of "disabled" means a state of the mobile device after theft prevention (anti-theft) procedures have been activated. In addition the term of "locked" means the mobile device display/keyboard/keypad/touchpad does not allow access to mobile device features and applications and is password protected. To unlock the mobile device, the correct password needs to be entered. This is a common feature on smartphones where the owner will set a password for the mobile device which is required to gain access to the mobile device display, keyboard, touchpad, and/or applications. The "locked" state may be activated at mobile device power up, restart, and after a period of inactivity.

2.1 Device Based Solutions for Mobile Device Theft Prevention

With access to the operating system on the smartphone, device-based solutions go beyond what is possible with operator and database aggregation solutions when it comes to restricting the functionality of a smartphone. As long as there is internet connectivity, via a cellular network, Wi-Fi, or etc., device-based solutions can be remotely operated to impose restrictions or trigger functions to protect data, draw attention, or determine the current location of the smartphone.

While specific behaviors may vary slightly, all solutions provide these basic features (1) Locate—get current location of the smartphone, (2) Alarm—ring or make noise even if the speaker is muted to help find smartphone, (3) Lock with PIN—prevent access to information and apps on the smartphone, (4) Erase—remove user information from the smartphone, and (5) Web Interface—a portal to remotely trigger and view status of the above actions.

Figure 4:
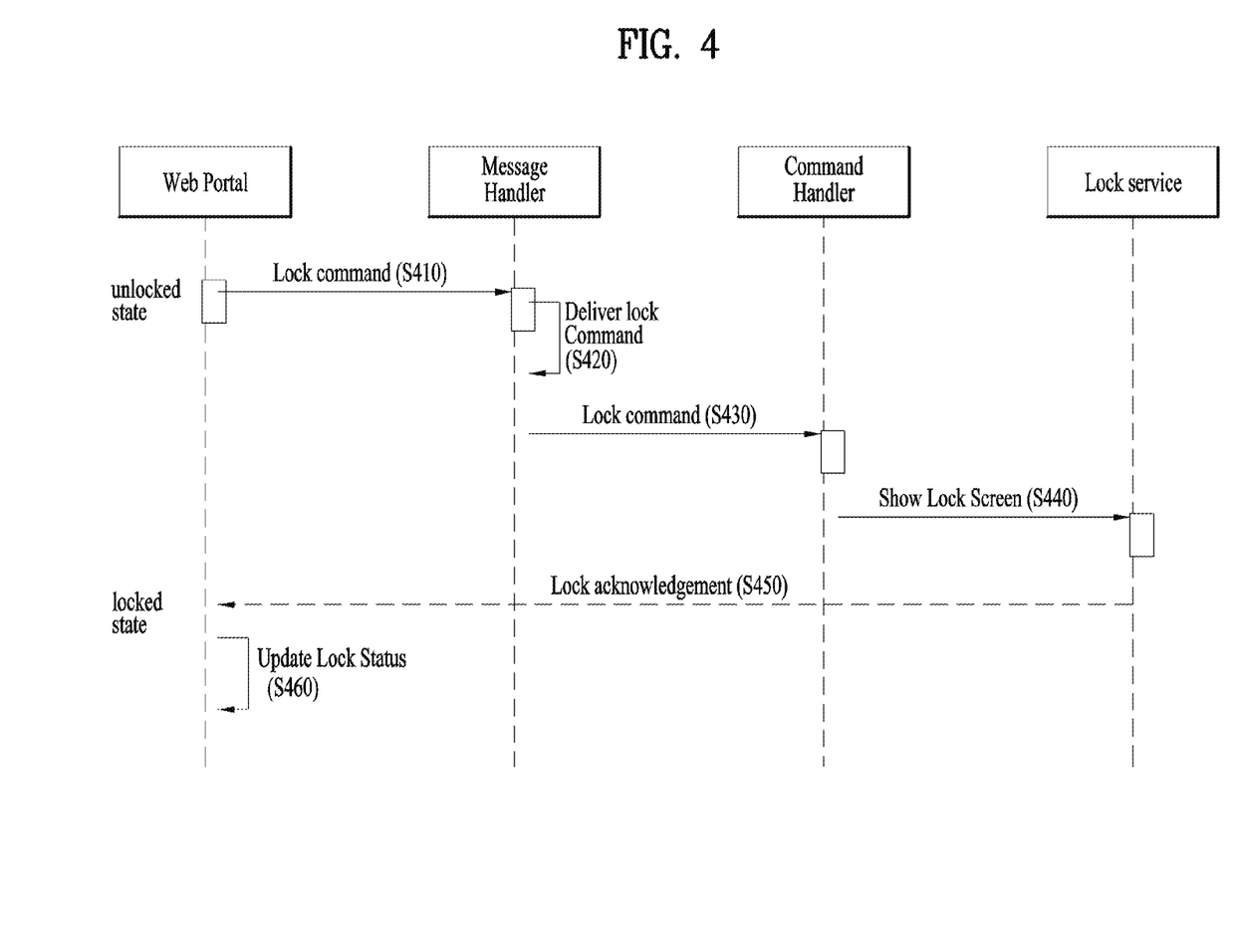
FIG. 4 illustrates one of methods for locking a mobile device for mobile device theft prevention.

FIG. 4 illustrates one of methods for locking a mobile device for mobile device theft prevention.

When a user lost or be stolen his or her mobile device (or smart phone, mobile equipment, user equipment etc.), the user tries to lock his/her mobile device via a web portal. For example, the user can only lock the mobile device from their mobile security web account (through computer or other user's mobile device) and only after they have registered their mobile security application. So, the user send a Lock Command message (or lock request message) from the web portal to the message handler (S410).

The message handler involved in network entity (or network server) delivers lock command message to the mobile security application on the mobile device (i.e., the smart phone) (S420, S430).

When the command handler that is the mobile security application on the mobile device receives the lock command message, the command handler sends a Show Lock Screen Command in order to trigger lock service which has been installed in the mobile device (S440).

If the mobile device is successfully locked, the mobile device transmits a lock acknowledgement to the web portal and the user is able to be recognized the status of the mobile device has been changed to "Locked" (S450).

After receive the Lock acknowledgement message from the Lock service entity, the web portal changes the screen to the user as a locked state (S460).

Figure 5:
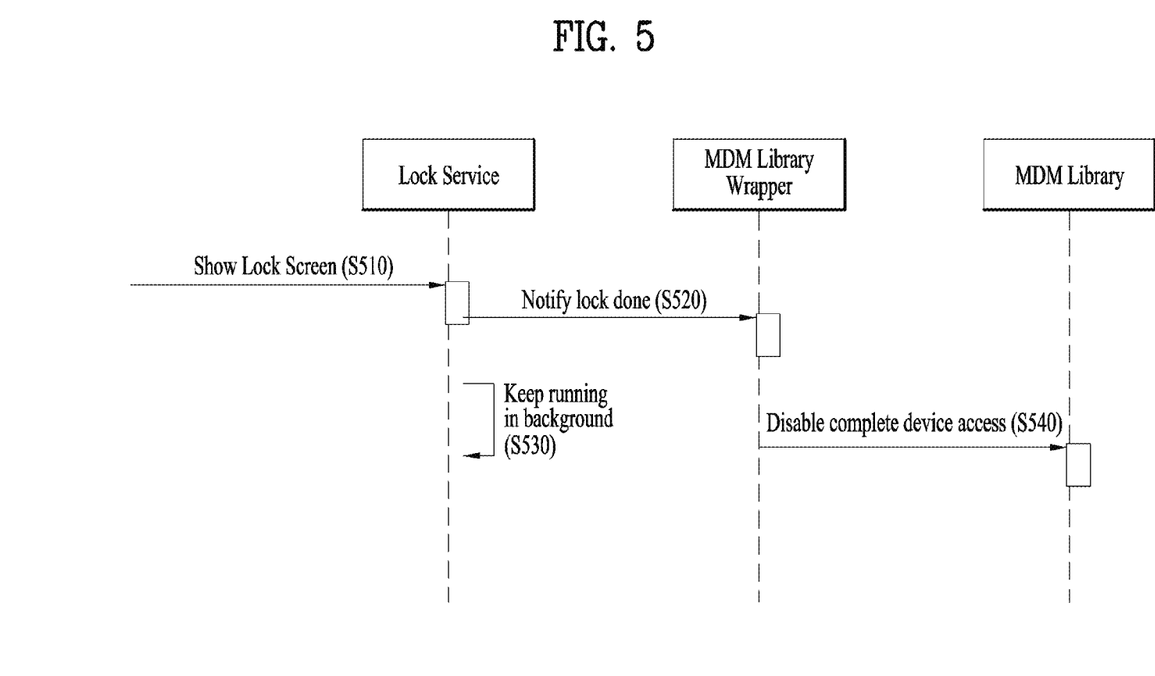
FIG. 5 illustrates one of methods for disabling mobile device access for mobile device theft prevention.

FIG. 5 illustrates one of methods for disabling mobile device access for mobile device theft prevention.

When a user lost or be stolen his or her mobile device (or smart phone, mobile equipment, user equipment etc.), the user tries to disable his/her mobile device via a web portal. That is, the user can enable mobile security lock down on the mobile device. For example, the user can only disable the mobile device from their mobile security web account (through computer or other user's mobile device) and only after they have registered their mobile security application. So, the user sends a Lock Screen Command to a lock service (S510).

The lock service settled in the mobile device sends a Notify lock done message to Mobile Device Management (MDM) Library Wrapper and the lock service keeps running in background on the mobile device (S520, S530).

MDM Library Wrapper transmits a Disable complete device access message to a MDM library. In this case if the mobile device has been completely disabled, attempts to access to a USB port and any tethering or a media transfer, an USB debugging, and a hard factory reset are prohibited (S540).

2.2 Methods for Displaying Identifications of Lost Mobile Device

If the mobile device has been locked or disabled by using only a conventional method such as the kill switch, it is hard for law enforcement (or, authorized entity) to identity the status of the mobile device under theft investigation because any attempt to access to the mobile device will be banned. Accordingly, the present invention provides methods for displaying identifications of mobile device (e.g., smart phone) to handle the situations previously mentioned. Hereinafter, methods to electronically display IDs (identifications) and ID-associated information on a mobile device display are described when one or more mobile device theft preventions (e.g., kill switch functionalities) are initiated.

Figure 6:
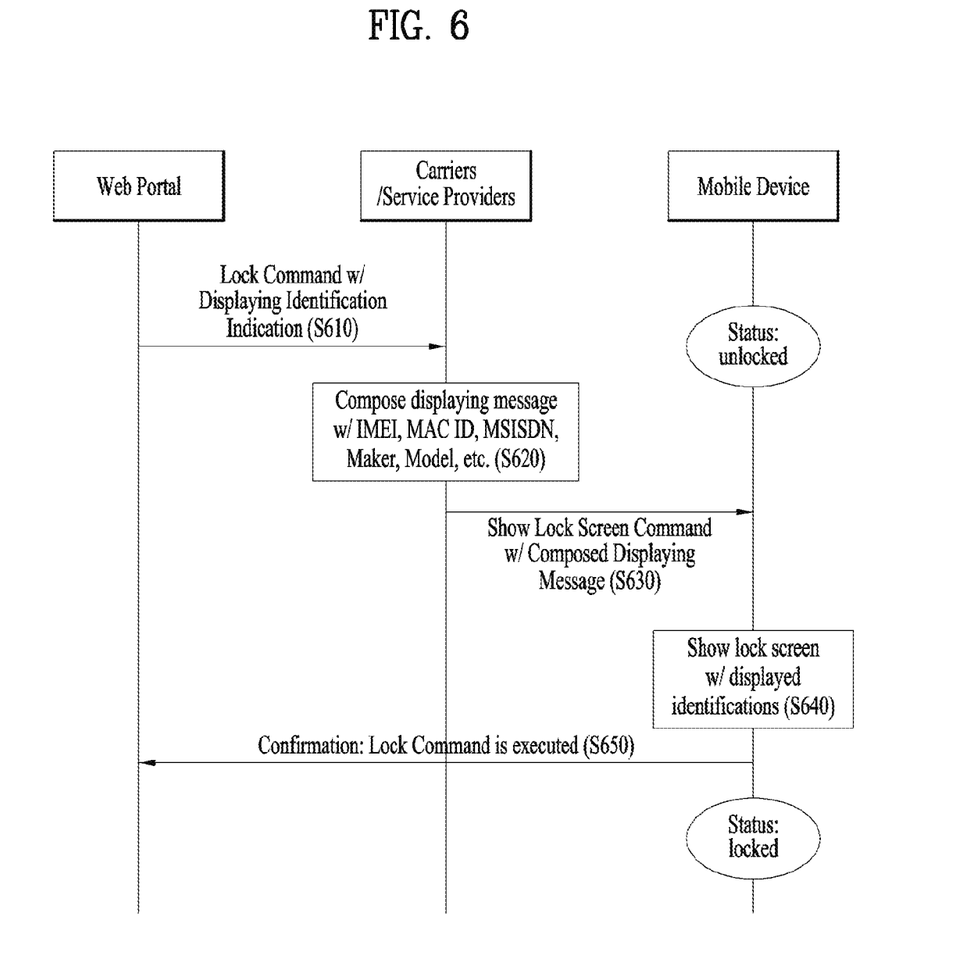
FIG. 6 illustrates one of methods for displaying identifications of lost mobile device.

FIG. 6 illustrates one of methods for displaying identifications of lost mobile device.

When a user lost or be stolen his or her mobile device (e.g., smart device, smart phone, mobile equipment, or user equipment etc.), the user may try to lock or disable his/her mobile device via a web portal. For example, the user (or, authorized owner) initiates "Lock Command" with a Displaying Identification Indication requesting a display of the lost device's identification information on a screen of the mobile device. That is, the user sends the Lock Command message to the authorized service provider in the owner's (or user's) account provided by the service provider (S610).

In this case, the service provider may be the Home PLMN operator or an OS provider or may be a Kill-switch service provider.

Upon receiving the Lock Command message, the service provider composes a displaying message including device identifications that will be displayed on a screen of the lost mobile device based on the stored Identity and/or subscription information in the service provider's repository for the mobile device (S620).

At the step of S620, the displaying message may be specific warning phases or the device identification itself. In this case, the device identifications may include an International Mobile Equipment Identifier (IMEI), an International Mobile Subscriber Identity (IMSI), a Medium Access Control IDentification (MAC ID) for Wi-Fi chipset, an MSISDN (Mobile Station International ISDN (Integrated Services Digital Network)) Number, or a Mobile Identification Number (MIN), a maker of the device, and/or a model name (plus number).

The Service provider transmits a paging message including the composed displaying message and a Show Lock Screen Command. In this case, the Show Lock Screen Command is used to trigger a lock service on the mobile device. For example, the Show Lock Screen Command provides an indication whether screen-lock is requested by the (kill-switch) service provider. The paging message may optionally include an indication whether the Show Lock Screen Command is requested by the service provider or the user (S630).

Table 1 shows one of formats for paging message which can be applied to the embodiments of the present invention.

TABLE 1

```
-- ASN1START
Paging ::=                  SEQUENCE {
       pagingRecordList       PagingRecordList         OPTIONAL,   -- Need ON
       systemInfoModification ENUMERATED {true}        OPTIONAL,   -- Need ON
```

TABLE 1-continued

```
        etws-Indication         ENUMERATED {true}      OPTIONAL,    -- Need ON
        nonCriticalExtension    Paging-v890-IEs        OPTIONAL
}
Paging-v890-IEs ::=       SEQUENCE {
        lateNonCriticalExtension  OCTET STRING         OPTIONAL,
        nonCriticalExtension    Paging-v920-IEs        OPTIONAL
}
Paging-v920-IEs ::=       SEQUENCE {
        cmas-Indication-r9      ENUMERATED {true}      OPTIONAL,    -- Need ON
        nonCriticalExtension    Paging-v1130-IEs       OPTIONAL
}
Paging-v1130-IEs ::=      SEQUENCE {
        eab-ParamModification-r11   ENUMERATED {true}  OPTIONAL,    -- Need ON
        nonCriticalExtension        SEQUENCE { }       OPTIONAL
}
Paging-v1400-IEs ::=      SEQUENCE {
        showLockScreenCommand-r14   ENUMERATED {true}  OPTIONAL,    -- Need ON
        nonCriticalExtension        SEQUENCE { }       OPTIONAL
}
PagingRecordList ::=      SEQUENCE (SIZE (1..maxPageRec)) PF PagingRecord
PagingRecord ::=          SEQUENCE {
        ue-Identity              PagingUE-Identity,
        device-Identity          Identity-to-display,
        cn-Domain                ENUMERATED    {ps, cs},
        ...
}
PagingUE-Identity ::=            CHOICE {
        s-TMSI                           S-TMSI,
        imsi                             IMSI,
        ...
}
Identity-to-display::=           CHOICE {
        IMEI                             IMEI
        s-TMSI                           S-TMSI,
        imsi                             IMSI,
        msISDN                           MSIDSN,
        ...
}
IMSI ::=                         SEQUENCE (SIZE (6..21)) OF IMSI-Digit
IMSI-Digit ::=                   INTEGER (0..9)
-- ASN1STOP
```

Table 2 shows functions of paging message fields.

TABLE 2

Paging field descriptions cmas-Indication
If present: indication of a CMAS notification
cn-Domain
Indicates the origin of paging.
eab-ParamModification
If present: indication of an EAB parameters (SIB14) modification.
etws-Indication
If present: indication of an ETWS primary notification and/
or ETWS secondary notification.
imsi
The International Mobile Subscriber Identity, a globally unique
permanent subscriber identity, see TS 23.003 [27]. The first
element contains the first IMSI digit, the second element contains
the second IMSI digit and so on.
systemInfoModification
If present: indication of a BCCH modification other than
SIB10, SIB11, SIB12 and SIB14.
ue-Identity
Provides the NAS identity of the UE that is being paged.
Show Lock Screen Command
Provides the indication whether screen-lock is requested by
the (kill-switch) service provider.
Identity-to-display
Provides the identity information requested by the (kill-switch)
service provider.

Referring to Tables 1 and 2, the device identifications are included in the paging message as the Identity-to-display field. The Show Lock Screen Command provides an indication whether the screen lock is requested by the service provider.

Referring back to FIG. 6, upon receiving the Show Lock Screen Command through the paging message, the mobile device performs screen lock procedure according to the Show Lock Screen Command and displays the device identifications requested by the service provider on the locked screen when the screen of the mobile device turns on and/or is staying on (S640).

The screen of the mobile device can be locked by the Show Lock Screen Command or by the device configurations of the user (owner).

After lock the screen and display the device identifications, the mobile device transmit a confirmation message indicating the lock command is executed (S650).

Figure 7:
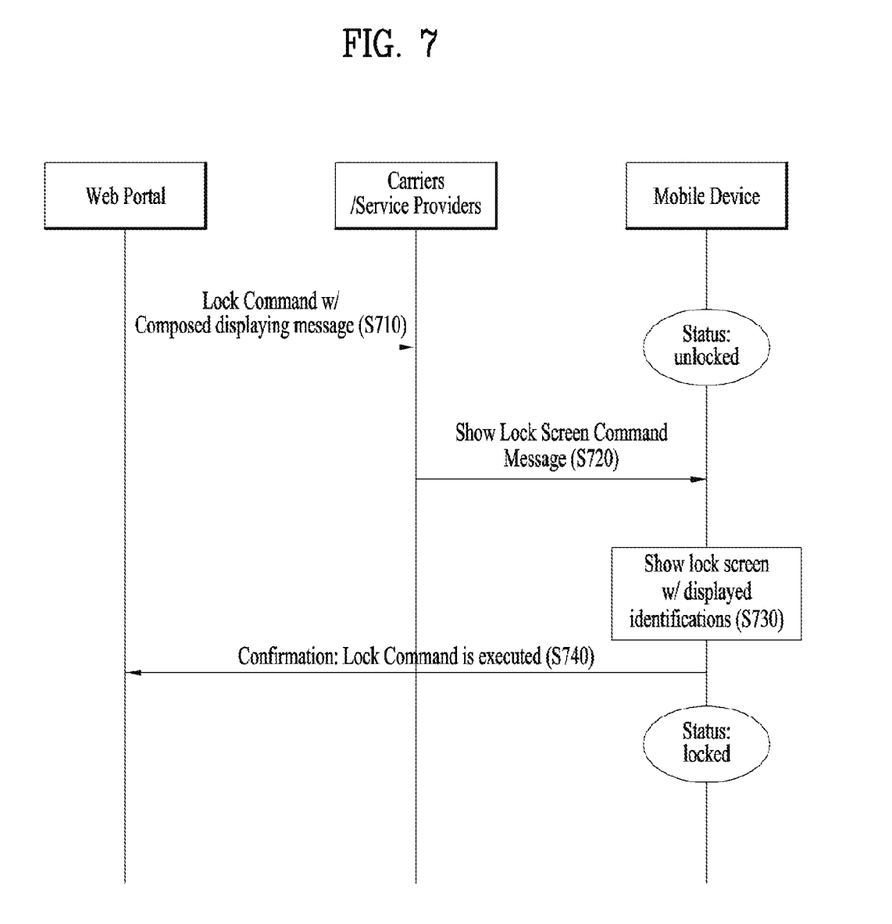
FIG. 7 illustrates another method for displaying identifications of lost mobile device.

FIG. 7 illustrates another method for displaying identifications of lost mobile device.

When a user lost or be stolen his or her mobile device (e.g., smart device, smart phone, mobile equipment, or user equipment etc.), the user may try to lock or disable his/her mobile device via a web portal. For example, the user (or, authorized owner) transmits "Lock Command" message including a Displaying Identification Indication and a displaying message to the authorized service provider in the owner's (or user's) account provided by the service provider (S710).

At the step S710, the displaying message may be composed by the user itself via the web portal. In this case, the user is able to write down his/her own message to the lost mobile device. The displaying message may include device identifications that will be displayed on a screen of the lost mobile device based on subscription information from user. In addition, the Lock Command message further includes the Displaying Identification Indication requesting a display of device identifications on a screen of the mobile device. In this case, the service provider may be the Home PLMN operator or an OS provider or may be a Kill-switch service provider.

Besides, the device identifications may include an International Mobile Equipment Identifier (IMEI), an International Mobile Subscriber Identity (IMSI), an Medium Access Control IDentification (MAC ID) for Wi-Fi chipset, an MSISDN (Mobile Station International ISDN (Integrated Services Digital Network) Number, or a Mobile Identification Number (MIN), a maker of the device, and/or a model name (plus number).

Upon receiving the Lock Command message, the service provider composes a Show Lock Screen Command message and transmits a paging message including the displaying message and the Show Lock Screen Command. In this case, the Show Lock Screen Command is used to trigger a lock service on the mobile device. For example, the Show Lock Screen Command may provide an indication whether screen-lock is requested by the (kill-switch) service provider. The paging message may optionally include an indication whether the Show Lock Screen Command is requested by the service provider or the user (S720).

Table 1 shows one of formats for paging message which can be applied to the embodiments of the present invention.

Upon receiving the Show Lock Screen Command through the paging message, the mobile device performs a screen lock procedure according to the Show Lock Screen Command and displays the device identifications requested by the service provider on the locked screen when the screen of the mobile device turns on and/or is staying on (S730).

The screen of the mobile device can be locked according to the Show Lock Screen Command or by the device configurations of the user (owner).

After lock the screen and display the device identifications, the mobile device transmit a confirmation message indicating the lock command is executed (S740).

Figure 8:
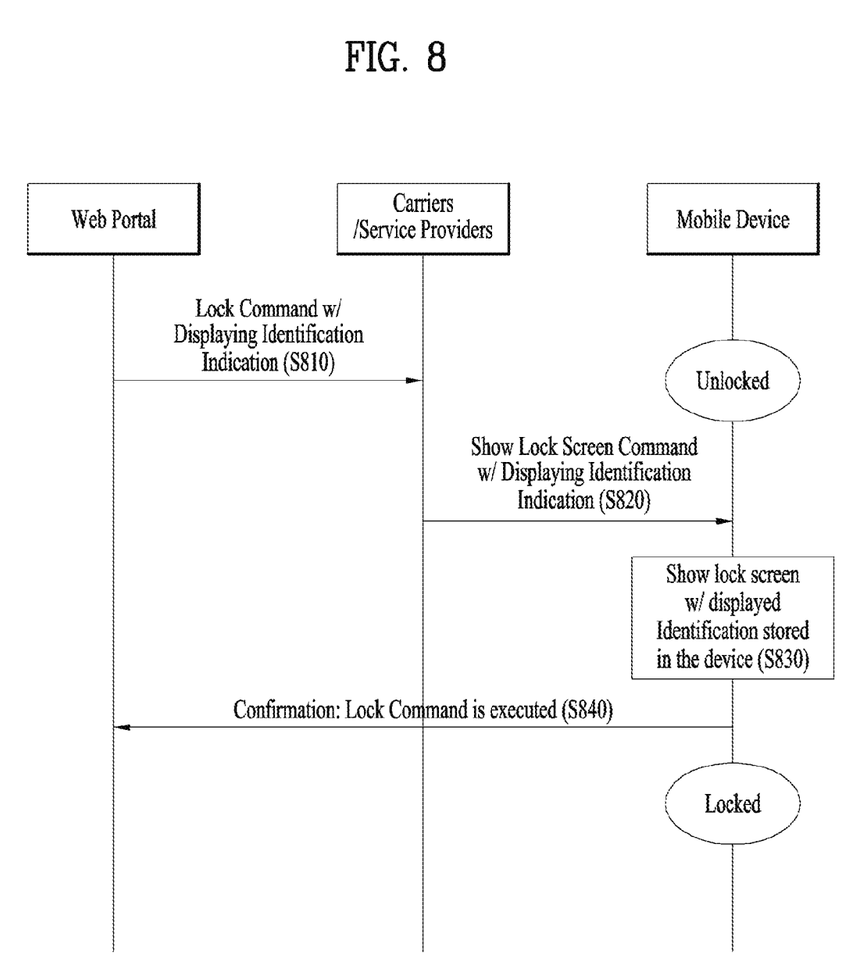
FIG. 8 illustrates still another method for displaying identifications of lost mobile device.

FIG. 8 illustrates still another method for displaying identifications of lost mobile device.

The embodiment illustrated on FIG. 8 is intended for the case where mobile device (e.g., Mobile Equipment (ME)) has USIM card in but also has some ID-information (e.g., the device identification) pre-stored locally in a memory of the mobile device. The difference between this method and the methods of FIGS. 6 and 7 lies in the fact that the (Kill-switch) service provider using this method does not have to send the ID-information to the lost mobile device.

Referring to FIG. 8, if a user has been stolen his or her mobile device (e.g., smart device, smart phone, mobile equipment, or user equipment etc.), the user may try to lock or disable his/her mobile device via a web portal. For example, the user (or, authorized owner) initiates "Lock Command" with a Displaying Identification Indication requesting a display of the lost device's identification information on a screen of the mobile device. That is, the user sends the Lock Command message to the authorized service provider in the owner's (or user's) account provided by the service provider (S810).

In this case, the service provider may be the Home PLMN operator or an OS provider or may be a Kill-switch service provider.

Upon receiving the Lock Command message, the service provider composes a Show Lock Screen Command message and transmits a paging message including the Show Lock Screen Command with Displaying Identification indication. That is, the paging message requests for the lost mobile device to display pre-stored ID-information (e.g., device identification of the mobile device) on the screen (S820).

At the step S820, the paging message may optionally include the indication whether the Show Lock Screen Command is requested by the (Kill-switch) service provider.

Table 3 shows another format for paging message which can be applied to the embodiments of the present invention.

TABLE 3

```
-- ASN1START
Paging ::=                SEQUENCE {
            pagingRecordList        PagingRecordList        OPTIONAL,    -- Need ON
            systemInfoModification  ENUMERATED {true}       OPTIONAL,    -- Need ON
            etws-Indication         ENUMERATED {true}       OPTIONAL,    -- Need ON
            nonCriticalExtension    Paging-v890-IEs         OPTIONAL
}
Paging-v890-IEs ::=       SEQUENCE {
            lateNonCriticalExtension OCTET STRING           OPTIONAL,
            nonCriticalExtension    Paging-v920-IEs         OPTIONAL
}
Paging-v920-IEs ::=       SEQUENCE {
            cmas-Indication-r9      ENUMERATED {true}       OPTIONAL,    -- Need ON
            nonCriticalExtension    Paging-v1130-IEs        OPTIONAL
}
Paging-v1130-IEs ::=      SEQUENCE {
            eab-ParamModificataion-r11   ENUMERATED {true}   OPTIONAL,   -- Need ON
            nonCriticalExtension         SEQUENCE { }       OPTIONAL
}
Paging-v1400-IEs ::=      SEQUENCE {
            showLockScreenCommand-r14    ENUMERATED {true}   OPTIONAL,   -- Need ON
            nonCriticalExtenson          SEQUENCE { }       OPTIONAL
}
PagingRecordList ::=      SEQUENCE (SIZE (1..maxPageRec)) OF PagingRecord
PagingRecord ::=          SEQUENCE {
            ue-Identity             PagingUE-Identity,
            cn-Domain               ENUMERATED   {ps, cs},
            ...
}
```

TABLE 3-continued

```
PagingUE-Identity ::=            CHOICE {
        s-TMSI                          S-TMSI,
        imsi                            IMSI,
        ...
}
IMSI ::=                         SEQUENCE SIZE (6..21)) OF IMSI-Digit
IMSI-Digit ::=                   INTEGER (0..9)
-- ASN1STOP
```

Table 4 shows functions of paging message fields of Table 3.

TABLE 4

Paging field descriptions cmas-Indication
If present: indication of a CMAS notification
cn-Domain
Indicates the origin of paging.
eab-ParamModification
If present: indication of an EAB parameters (SIB14) modification.
etws-Indication
If present: indication of an ETWS primary notification and/
or ETWS secondary notification.
imsi
The International Mobile Subscriber Identity, a globally unique
permanent subscriber identity, see TS 23.003 [27]. The first
element contains the first IMSI digit, the second element
contains the second IMSI digit and so on.
systemInfoModification
If present: indication of a BCCH modification other than
SIB10, SIB11, SIB12 and SIB14.
ue-Identity
Provides the NAS identity of the UE that is being paged.
Show Lock Screen Command
Provides the indication whether screen-lock is requested by
the (kill-switch) service provider.

The Tables 3 and 4 can be used when the mobile device has USIM card and also has device identifications which has been pre-stored in the mobile device. In this case, the device identifications are already stored in the lost mobile device, the device identifications do not needed to be transmitted to the lost mobile device.

Referring back to FIG. 8, upon receiving the Show Lock Screen Command through the paging message, the mobile device performs screen lock procedure according to the Show Lock Screen Command and displays the device identifications requested by the service provider on the locked screen when the screen of the mobile device turns on and/or is staying on (S840).

The device identifications may include an International Mobile Equipment Identifier (IMEI), an International Mobile Subscriber Identity (IMSI), an Medium Access Control IDentification (MAC ID) for Wi-Fi chipset, an MSISDN (Mobile Station International ISDN (Integrated Services Digital Network) Number, or a Mobile Identification Number (MIN), a maker of the device, and/or a model name (plus number).

In conventional methods, the Lock Screen Command is transmitted from application layer through a data channel or a transport channel. In this case, the coverage of the data channel or the transport channel is relatively short. However, the Lock Screen Command of the present invention is transmitted via the paging message, the coverage of the Lock Screen Command is relatively broad compared with the conventional method. Accordingly, even though the theft takes the lost mobile device to far away where the data or transport channel cannot be reached, the user is able to lock or disable the lost mobile device.

In addition, the paging message also includes the device identifications, the lost mobile device is able to display the device identifications on the locked screen. By doing this, the law enforcement or authorized entity can easily identify the mobile device is lost or stolen mobile device.

Figure 9:
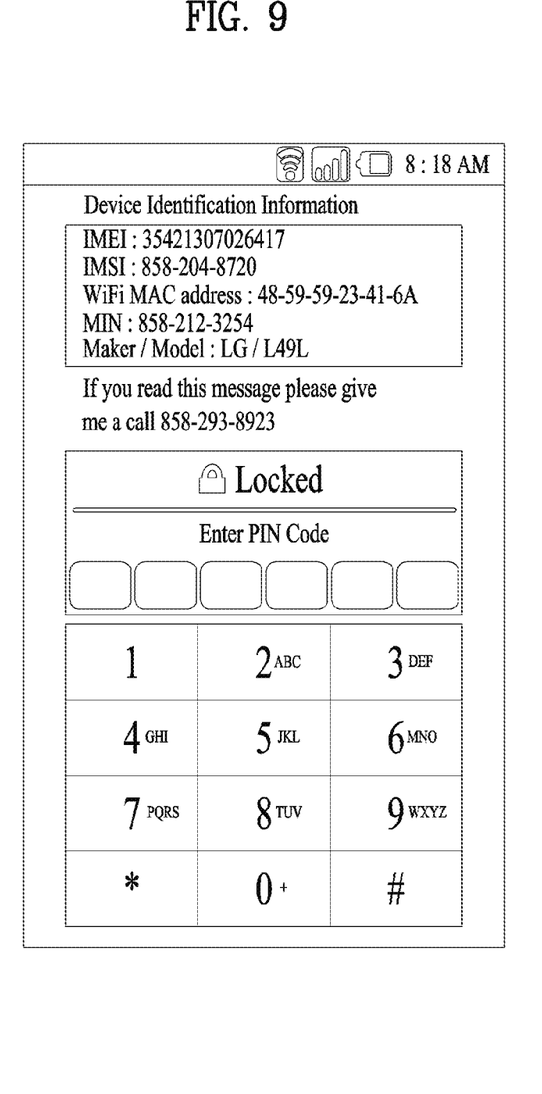
FIG. 9 illustrates one of examples of the mobile device's screen displaying the device identifications.

FIG. 9 illustrates one of examples of the mobile device's screen displaying the device identifications.

Referring to FIG. 9, the mobile device performs the screen lock procedure according to the Show Lock Screen Command So, the mobile device has been lock and it cannot operate without proper password or PIN code. In addition, the lock screen displays the device identifications such as IMEI, IMSI, WiFi MAC address, MIN, and Maker/Model information. In addition, the lock screen also displays the composed displaying message that "If you read this message please give me a call 858-293-8923". The displaying message are merely one of examples and the message can be varied according to the user or the service provider. In addition, the device identification information is changed according to the mobile device.

4. Apparatuses for Implementing the Aforementioned Methods

Figure 10:
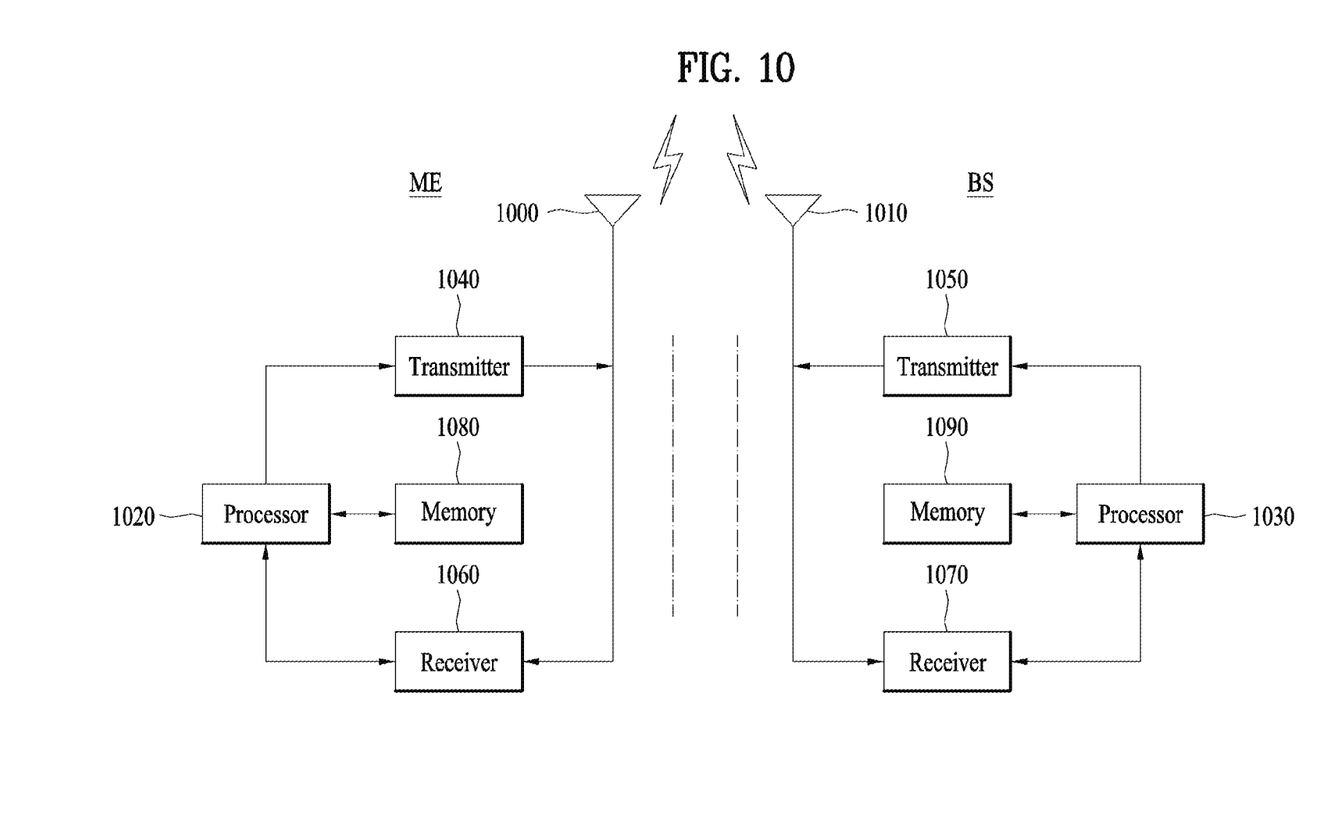
FIG. 10 shows apparatuses for implementing the above-mentioned methods described with reference to FIGS. 1 to 9.

FIG. 10 shows apparatuses for implementing the above-mentioned methods described with reference to FIGS. 1 to 9.

A mobile device can serve as a transmitting end on uplink and as a receiving end on downlink. A service provider can serve as a receiving end on uplink and as a transmitting end on downlink.

The mobile device and the service provider may include a transmitter 1040 and 1050 and receiver 1060 and 1070 for controlling transmission and reception of signal, data and/or messages and antennas 1000 and 1010 for transmitting and receiving signal, data and/or messages, respectively.

In addition, the mobile device and the service provider may respectively include processors 1020 and 1030 for performing the above-described embodiments of the present invention and memories 1070 and 1090 for storing processing procedures of the processors temporarily or continuously.

The embodiments of the present invention can be performed using the aforementioned components and functions of the mobile device and the service provider B. The apparatuses shown in FIG. 10 may be one of members illustrated in FIGS. 1 and 2. In addition, the service provider in FIG. 10 can be referred to the service provider or the PLMN.

The service provider transmits the paging messages including the Show Lock Screen Command and/or displaying message and/or Displaying Identification indication to the mobile device (i.e., the UE). If the mobile device receives the paging message through the receiver, the process of the mobile device controls the screen (or, display) to display the device identification, displaying message and to lock the screen.

The transmitter 1040 and 1050 and the receiver 1060 and 1070 included in the mobile device and the service provider can have packet modulation and demodulation functions, a fast packet channel coding function, an OFDMA packet scheduling function, a TDD packet scheduling function and/or a channel multiplexing function. In addition, the mobile device and the service provider may further include a low-power radio frequency (RF)/intermediate frequency (IF) module.

In the embodiments of the present invention can use a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smart phone, a multi-mode multi-band (MM-MB) terminal or the like as the mobile device.

Here, the smart phone is a terminal having advantages of both a mobile communication terminal and a PDA. The smart phone can be a mobile communication terminal having scheduling and data communication functions including facsimile transmission/reception, Internet access, etc. of the PDA. The MM-MB terminal means a terminal including a multi-modem chip, which can be operated in both a portable Internet system and a mobile communication system (e.g., CDMA 2000 system, WCDMA system, etc.).

The exemplary embodiments of the present invention may be achieved by various means, for example, hardware, firmware, software, or a combination thereof.

In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention may be applied to various wireless access systems. The wireless access systems include 3GPP, 3GPP2 and/or IEEE 802.xx (Institute of Electrical and Electronic Engineers 802) system, etc. The embodiments of the present invention may be applied to technical fields using the various wireless access systems in addition to the wireless access systems.

What is claimed is:

1. A method for displaying identifications of a mobile device for anti-theft operation in a wireless access system, the method performed by the mobile device and comprising:
    receiving a paging message Including a command indicating whether screen-lock is requested, a display message generated by an owner of the mobile device, and a display indication requesting display of a device identification; and
    displaying the device identification and the display message on a locked screen according to the command and the display indication.

2. The method of claim 1, wherein the device identification includes at least an International Mobile Equipment Identifier, an International Mobile Subscriber identity, a Medium Access Control IDentification for a Wi-Fi chipset, a Mobile Station International ISDN Number, a Mobile Identification Number, a maker of the device, or a model name of the device.

3. The method of claim 2, wherein the paging message further includes the device identification.

4. The method of claim 2, wherein the device, identification is pre-stored in the mobile device.

5. The method of claim 2, wherein the device identification is generated by a a wireless carrier, an OS provider, or a $3^{rd}$ party service provider.

6. The method of claim 1, wherein the display message includes a specific warning phrase.

7. A mobile device for displaying identifications for anti-theft operation in a wireless access system, the mobile device comprising:
    a receiver configured to receive signals;
    a screen configured to display information; and
    a processor configured to:
    control the receiver to receive a paging message including a command indicating whether screen-lock is requested, a display message generated by an owner of the mobile device, and a display indication requesting display of a device identification; and
    control the screen to display the device identification and the display message on a locked screen according to the command and the display indication.

8. The mobile device of claim 7, wherein the device identification includes at least an International Mobile Equipment Identifier, an International Mobile Subscriber Identity, a Medium Access Control IDentification for a Wi-Fi chipset, a Mobile Station International ISDN Number, a Mobile Identification Number, a maker of the device, or a model name of the device.

9. The mobile device of claim 8, wherein the paging message further includes the device identification.

10. The mobile device of claim 8, wherein the device identification is pre-stored in the mobile device.

11. The mobile device of claim 8, wherein the device identification is generated by a wireless carrier, an OS provider, or a $3^{rd}$ party service provider.

12. The mobile device of claim 8, wherein the display message includes a specific warning phrase.

* * * * *